United States Patent [19]

Kubota

[11] Patent Number: 4,541,756
[45] Date of Patent: Sep. 17, 1985

[54] REVOLVING CUTTING TOOL

[76] Inventor: Masao Kubota, 22-7, Narimasu 2-chome, Itabashi-ku, Tokyo, Japan

[21] Appl. No.: 423,173

[22] Filed: Sep. 24, 1982

[30] Foreign Application Priority Data

Oct. 1, 1981 [JP] Japan .................. 56-154844

[51] Int. Cl.³ .................. B27G 13/02; B23C 5/02
[52] U.S. Cl. .................. 407/45; 407/37; 407/63
[58] Field of Search .......... 144/117 R, 227; 407/63, 407/45, 62, 47, 48, 51, 44, 36, 37

[56] References Cited

U.S. PATENT DOCUMENTS

| | | | |
|---|---|---|---|
| 650,924 | 6/1900 | Boynton | 407/63 |
| 1,664,806 | 4/1928 | Betterley | |
| 2,969,816 | 1/1961 | Johnsa | 144/117 R |
| 3,082,802 | 3/1963 | Dickson et al. | 144/117 R |
| 3,732,611 | 5/1973 | Watanabe | |

FOREIGN PATENT DOCUMENTS

| | | |
|---|---|---|
| 301957 | 11/1917 | Fed. Rep. of Germany . |
| 266438 | of 1950 | Fed. Rep. of Germany ...... 144/221 |
| 913694 | 6/1954 | Fed. Rep. of Germany . |
| 2004266 | 8/1971 | Fed. Rep. of Germany ...... 144/221 |
| 1351187 | 3/1963 | France . |

Primary Examiner—Leonidas Vlachos
Assistant Examiner—Jerry Kearns
Attorney, Agent, or Firm—Merchant, Gould, Smith, Edell, Welter & Schmidt

[57] ABSTRACT

A cutting tool revolvable about a center axis, comprising a rake surface defined by a plane inclined with respect to the center axis, a cutting edge having a profile which is defined by an intersecting line between a rotational surface drawn by the revolution of the cutting edge and the inclined plane, and a cylindroid clearance surface having generatrices extending in the same direction along a directrix defined by the cutting edge profile.

4 Claims, 12 Drawing Figures

REVOLVING CUTTING TOOL

This invention relates to a cutting tool which revolves with a cutting edge having a two-dimensional profile, such as a planing cutter, a milling cutter, or the like, for machining a plane, a cylindroid, or a surface which can be produced by rotating a generatrix around an axis.

A rotary cutting tool of the present invention can be advantageously used with a planer or a milling machine or the like and, in particular, with a wood planer to produce a flat or cylindroid surface of a wooden plate. However, the invention is not limited to such machines or such kind of machining.

Since the application of the invention to a wood-machining planer for finishing a plane surface is important, the following discussion is effected with reference to a wood-machining planer. However, the invention is not limited thereto.

It is desirable, as is well known, to use a cutter having helical cutting edges in order to effect smooth and silent machining for example in a wooden planer because the cutting edges discontinuously come into contact with a surface of a workpiece, thus resulting in a continuous cutting operation. However, it is very difficult and expensive to manufacture such a cutter with helical cutting edges. In addition, when the cutting edges become worn after long use of the cutter, the cutter has to be reground to produce a predetermined shape of the helical cutting edges. However, such regrinding necessitates a special high technique and complex equipment available only for the helical cutting edges, resulting in an increase of the cost and time necessary for regrinding.

The primary object of the present invention is, therefore, to eliminate the above-mentioned drawbacks by providing a revolving cutting tool having a two-dimensional cutting edge profile which can be easily assembled and ground and which has the substantially same cutting efficiency and technical effects as a helical cutting edge.

The invention will be discussed below in detail, with reference to the accompanying drawings, in which.

Figure 1:
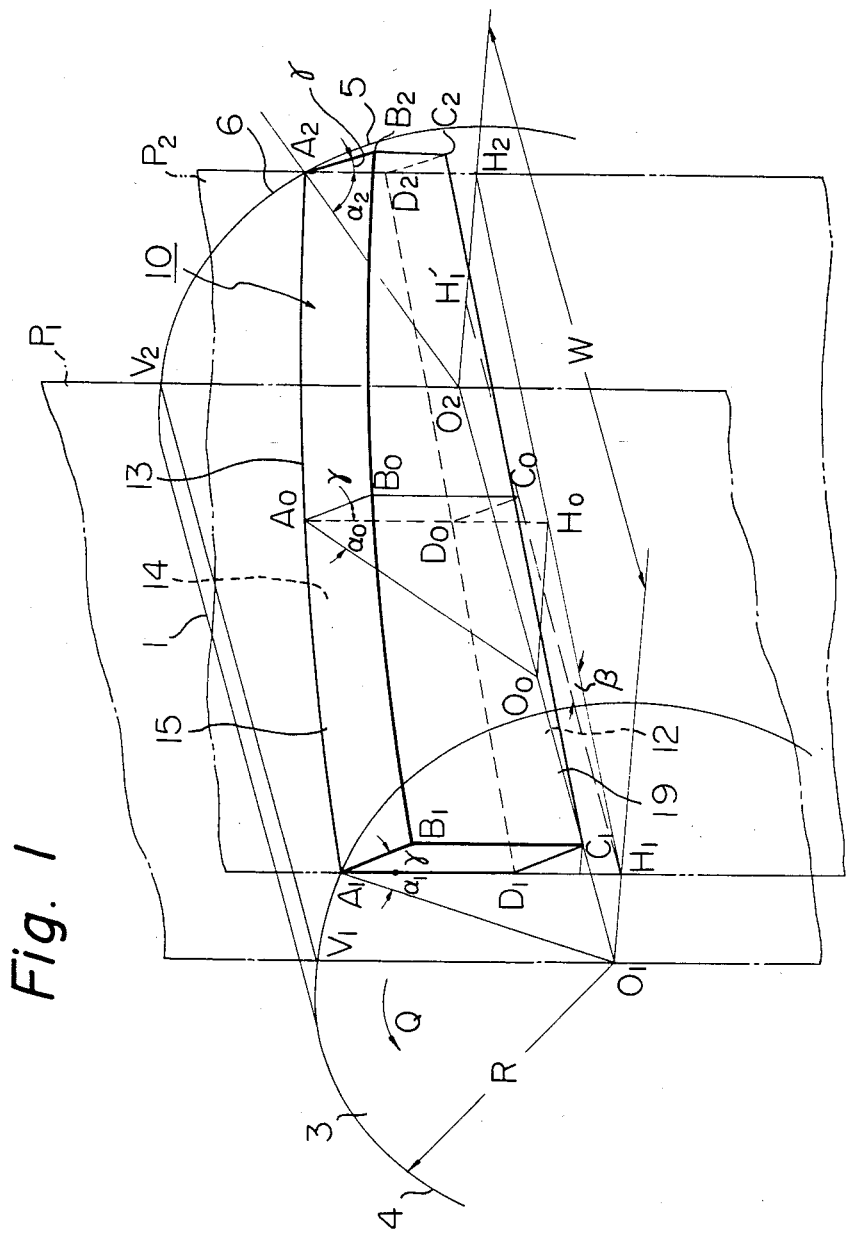
FIG. 1 is a schematic perspective view showing a principle of the formation of a cutting edge tip of a cutting tool, according to the present invention.

In FIG. 1, an imaginary cylindrical body 1 which substantially corresponds to a cutter body of a planer has a longitudinal center axis $\overline{O_1O_2}$ about which a cutting edge tip 10 is rotatable in the direction indicated by the arrow Q. The axial length of the line $\overline{O_1O_2}$ and the radius of the cylindrical body 1 are designated by W and R, respectively (e.g., W=120 mm, R÷64 mm). The cylindrical body 1 has opposed end faces 3 and 5, defined by end circles 4 and 6, respectively, having the same radius R.

A first vertical plane $P_1$, which includes the axis $\overline{O_1O_2}$, intersects the end circles 4 and 6 at the upper points $V_1$ and $V_2$, respectively (lower intersecting points can be withdrawn from consideration herein). The line connecting the points $V_1$ and $V_2$ is a straight line.

When the cylindrical body 1 is cut by a second vertical plane $P_2$ which is inclined at an angle $\beta$ (e.g., $\beta \div 7° \sim 8°$) with respect to the first vertical plane $P_1$, the intersecting line 13, i.e., $\overline{A_1A_2}$ ($A_1$ and $A_2$ are intersecting points between the second vertical plane $P_2$ and the end circle 4 and between the plane $P_2$ and the end circle 6, respectively), between the outer cylindrical surface of the cylindrical body 1 and the second vertical plane $P_2$ is an elliptical arc. It is well known that when a cylinder is cut by a plane inclined with respect to a plane including the central axis of the cylinder, the cut face of the cylinder thus obtained has an elliptical profile. $A_0$ is an optional point on the elliptically curved line 13.

$H_1$ and $H_2$ are points on the second vertical plane $P_2$ and on the end faces 3 and 5, respectively, and the lines $\overline{O_1H_1}$ and $\overline{O_2H_2}$ are perpendicular to the second vertical plane $P_2$, respectively. Namely, the lines $\overline{O_1H_1}$ and $\overline{O_2H_2}$ are perpendicular to $\overline{A_1H_1}$ and $\overline{A_2H_2}$, respectively. It goes without saying that the angle formed by the lines $\overline{O_1O_2}$ and $\overline{H_1H_2}$ is identical to the angle $\beta$.

The elliptical arc 13 ($\overline{A_1A_0A_2}$) and the second vertical plane $P_2$ correspond to the two-dimensional profile of the cutting edge and a rake surface 14 of the tip 10, respectively. When the cutting edge (elliptical arc) 13 is rotated about the center axis $\overline{O_1O_2}$, it draws an cylindrical surface corresponding to the cylindrical surface of the cylindrical body 1. Therefore, when, for example, a platelike workpiece (not shown) is reciprocally moved in a plane while keeping in contact with the cylindrical surface, the workpiece can be planing-machined by the cutting edge, similar to the case of a helical cutting edge.

Rake angles of the tip 10 on the end faces 3 and 5 are defined by $<O_1A_1H_1$ ($=\alpha_1$) and $<O_2A_2H_2$ ($=\alpha_2$), respectively. Generally, a rake angle $\alpha_0$ of the tip 10 in a plane parallel to the end faces 3 and 5, i.e., perpendicular to the axis $\overline{O_1O_2}$ and including the point $A_0$, is defined by $<O_0A_0H_0$ ($O_0$ and $H_0$ are points on the line $\overline{O_1O_2}$ and the line $\overline{H_1H_2}$, respectively, and $\Delta\ O_0A_0H_0$ is parallel to $\Delta\ O_1A_1H_1$ and $\Delta\ O_2A_2H_2$, i.e., perpendicular to the line $\overline{O_1O_2}$).

The rake angle depends on the material of the workpiece. For example, in the case of a wood workpiece, the maximum and minimum rake angles $\alpha_{max}$ and $\alpha_{min}$ are usually about 40° and 15°, respectively.

There is the following relationship between the rake angles $\alpha_1$ and $\alpha_2$.

$$\overline{O_2H_2} = \overline{O_2H_1'} + \overline{H_1'H_2}$$

wherein $H_1'$ is an intersecting point between the line $\overline{O_2H_2}$ and a line parallel to the axis $\overline{O_1O_2}$ and passing the point $H_1$.

$$\therefore \overline{O_2H_2} = \overline{O_1H_1} + \overline{H_1'H_2} \qquad (1)$$

$$\therefore R\sin\alpha_2 = R\sin\alpha_1 + W\tan\beta$$

$$\therefore \sin\alpha_2 = \sin\alpha_1 + \frac{W}{R}\tan\beta$$

As can be seen from the equation (1), $\alpha_2$ is larger than $\alpha_1$ when $0<\beta<90°$. Generally, the rake angle $\alpha_0$ gradually and continuously increases toward $\alpha_2$ from $\alpha_1$.

It should be noted here that, in the case of a conventional helical cutting edge, the rake angle is constant, as is well known. However, the fact that in the present invention the rake angle is not constant and varies in the direction of the width of the tip, as mentioned above, is unimportant as long as the largest rake angle $\alpha_2$ is not larger than the allowable maximum rake angle $\alpha_{max}$ which can be predetermined in accordance with the material of a workpiece ($\alpha_2 \leq \alpha_{max}$) and the smallest rake angle $\alpha_1$ is not smaller than the minimum rake angle $\alpha_{min}$ which can also be predetermined in accordance with the material of a workpiece ($\alpha_1 \geq \alpha_{min}$).

With respect to a tool angle, it is usully constant over the full width of the cutting edge. Therefore, also in the present invention, the tool angle $\gamma$ in a plane normal to the axis $\overline{O_1O_2}$ and parallel to the end faces 3 and 5 is constant over the width of the cutting edge.

Figure 2:
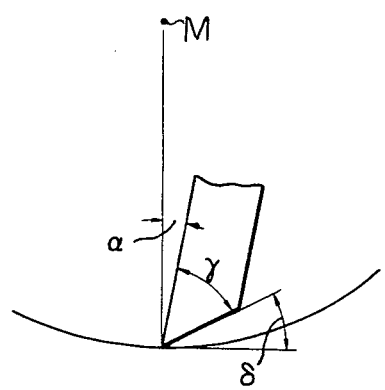
FIG. 2 is a schematic view of a tool showing the relationship between a rake angle, a tool angle, and a clearance angle.

As shown in FIG. 2, there is the following relationship between the rake angle $\alpha$, the tool angle $\gamma$, and the clearance angle $\delta$ of a cutting tool.

$$\alpha + \gamma + \delta = 90°$$

In FIG. 1, M designates the center of the cutting tool.

Therefore, the clearance angles $\delta_1$ and $\delta_2$ on the end faces 3 and 5 are given, respectively, by the following equations.

$$\delta_1 = 90° - \gamma - \alpha_1 \qquad (2)$$

$$\delta_2 = 90° - \gamma - \alpha_2 \qquad (3)$$

As can be seen from the equations (2) and (3), the clearance angle decreases as the rake angle increases, and vice versa, when the tool angle is constant. Since the rake angle varies in the direction of the width of the cutting edge in the present invention, as mentioned above, the clearance angle also varies in the direction of the width of the cutting edge. Although the cutting force decreases, in general, as the rake angle or the clearance angle increases, as is well known, the cutting force can always be kept substantially constant in the present invention because the larger the rake angle, the smaller the clearance angle at a constant tool angle. When the rake angles $\alpha_1$ and $\alpha_2$ are determined, the values of the clearance angles $\delta_1$ and $\delta_2$ should be taken into consideration because the clearance angles depend on the rake angles, as shown by the equations (2) and (3).

The discussion will now be directed to the formation of a clearance surface of the tip 10.

The clearance surface 15 is a cylindroid surface which has the varying clearance angle $\delta$ gradually decreasing from the end face 3 toward the end face 5 so as to satisfy the condition that the rake angle $\alpha$ plus the clearance angle $\delta$ is constant ($\alpha + \delta = $ constant) and which is produced by a directrix consisting of the elliptical arc profile $\overline{A_1A_0A_2}$ of the cutting edge. Generatrices defining the cylindroid clearance surface preferably extend normal to the axis $\overline{O_1O_2}$ but may not extend normal thereto.

Figure 8:
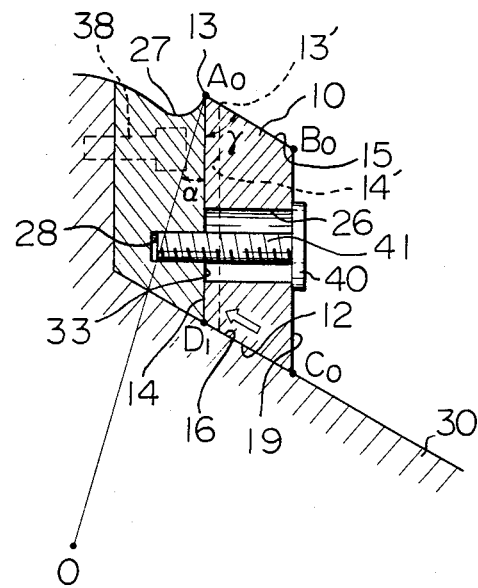
FIG. 8 is a sectional view of a cutting edge tip attached to a cutter body, the view being taken along a plane normal to the center axis of the cutter body.
Figure 7:
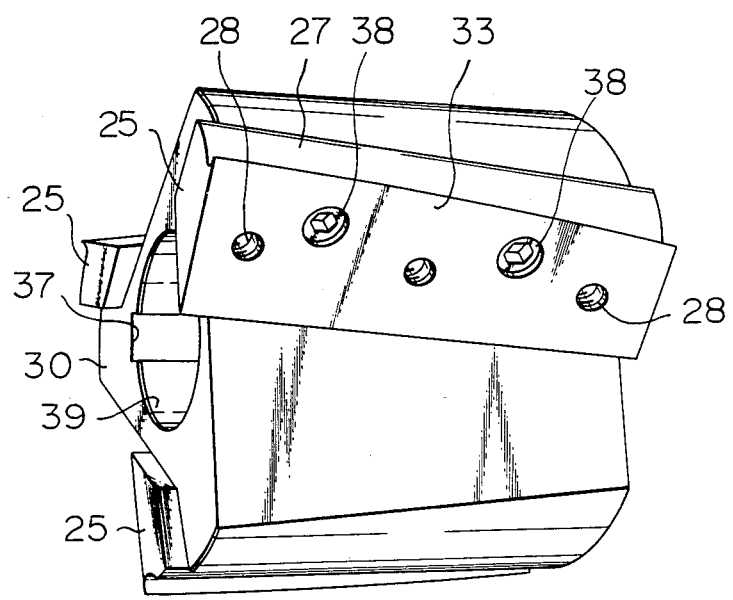
FIG. 7 is a perspective view of a cutter body without a cutting edge tip.

A back surface 19 opposite to the rake surface 14 which is included in the inclined vertical plane $P_2$ can be any curved surface but is preferably a plane parallel to the rake surface 14 because the surface 19 is used as a reference surface when the rake surface is finished so that the rake surface 14 can be easily ground by using the reference plane surface 19. The rake surface 14 comes into close contact with a corresponding plane surface 33 (FIGS. 7 and 8) of a cutter body 30 of the planer when the tips 10 are assembled on and attached to the cutter body 30. According to the present invention, since the rake surface 14 is a plane surface, it can be easily brought into close contact with the corresponding plane surface 33 of the cutter body 30. Although in the illustrated embodiment, the plane surfaces 33 are formed on swarf (or chip)-treating blocks 25 each having a swarf-escaping groove 27 and being detachably secured to the cutting body 30 by means of set screws 38 (FIG. 7), the swarf-escaping grooves 27 and the plane surfaces 33 may be directly formed on the cutter body 30 without the provision of such separate swarf-treating blocks 25.

A bottom surface 12 opposite to the clearance surface 15 of the tip 10 consists of a cylindroid or plane which is parallel to the direction of the generatrices defining the clearance surface 15. Preferably, the surface 12 is a plane since it is used as a reference surface when the clearance surface is ground or finished.

When the bottom surface 12 is parallel to the generatrices of the clearance surface 15, the cross-sections of the tip 10 normal to the axis $\overline{O_1O_2}$ are parallelograms $A_1B_1C_1D_1$ and $A_2B_2C_2D_2$ on the end faces 3 and 5, respectively, and $A_0B_0C_0D_0$ in an optional plane normal to the axis $\overline{O_1O_2}$. Therefore, when the cutting edge 13 has worn, a new cutting edge 13' (FIG. 8) identical to the cutting edge 13 can be easily obtained merely by face-grinding the rake surface 14. That is, regrinding of the cutting edge becomes very simple and easy. Furthermore, after regrinding, the tip 10 can be easily and simply attached to the cutter body 30 (and the swarf-treating block 25) merely by translation of the tip on and along a supporting surface 16 of the cutter body 30, corresponding to the opposite surface 12 of the tip 10.

It is desirable to provide on the cutter body 30 a guide block 100 (FIG. 11) having a flat guide surface 100A corresponding to one of the end faces ($A_1B_1C_1D_1$ or $A_2B_2C_2D_2$) of the tip 10 so that when the tip 10 is reassembled on the cutter body 30, the tip 10 can slide on the supporting surface 16 while being in contact with the guide surface 100A of the guide block 100 at the associated end face of the tip 10. The guide block 100 provides a constant position for the tip 10 in the lengthwise direction thereof. The guide block 100 is, for example, in the form of a U-shaped magnetic member, as designated by an imaginary line shown in FIG. 11, so that it can be magnetically detachably attached to the end face of the cutter body 30. The guide block 100 is attached only when the cutting edge tip 10 is assembled or ressembled on the cutter body.

Figure 3:
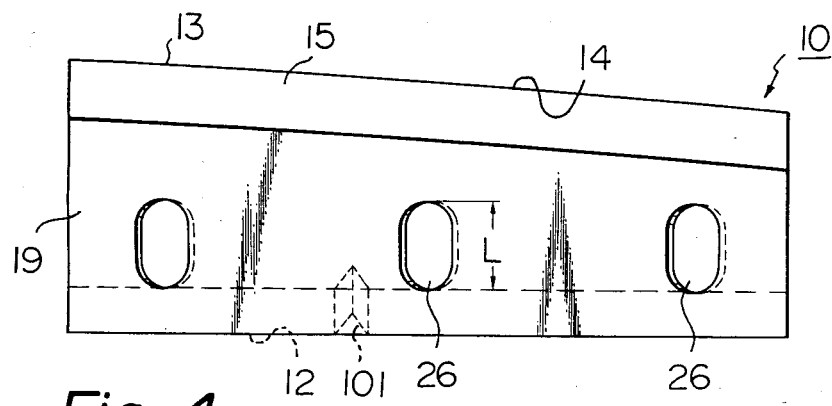
FIG. 3 is a front elevational view of a cutting edge tip 10, according to the present invention.
Figure 4:
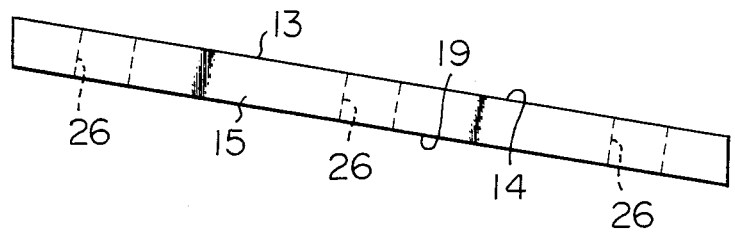
FIGS. 4 and 5 are plan and left side elevational views of FIG. 3, respectively.

Alternatively, it is also possible to provide, for example, a V-shaped recess 101 (imaginary lines) on the bottom surface 12 of the tip 10, as shown in FIG. 3, and to provide a projection (not shown) having the corresponding V-shape on the supporting surface 16 so that, the tip 10 can be prevented from displacing in the lengthwise direction when it slides on the supporting surface 16.

The tips 10 are removably secured to the swarf-treating blocks 25 (or to the cutter body in case of the absence of separate swarf-treating blocks) by means of the set screws 40. Each of the tips 10 has at least one, preferably two or three, elongated through holes 26 through which the set screws 40 extend. The through holes 26 have a length L (FIG. 3) which is larger than the diameter of the threaded portions 41 of the set screws 40 so that the set screws 40 can be screwed in the corresponding threaded holes 28 of the swarf-treating blocks 25 even after the cutting edge 13 is reground to produce the new cutting edge 13', that is, even after the tip 10 is translated in the direction designated by the arrow in FIG. 8 in parallel motion along and on the supporting surface 16 of the cutter body 30 to bring a new rake surface 14' (FIG. 8) into close contact with the surface 33.

Figure 5:
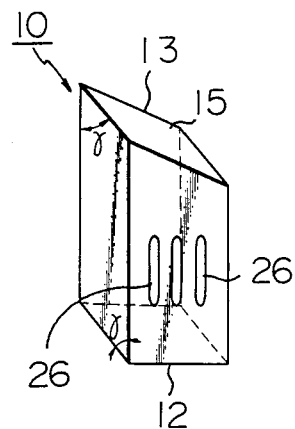
Figure 6:
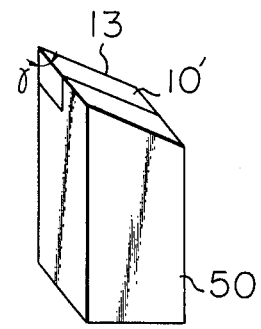
FIG. 6 is a view similar to FIG. 5 but shows a modification of a cutting edge tip.

FIG. 6 shows a modification of a cutting edge tip. In FIG. 6, a piece of a smaller tip 10' having the elliptical cutting edge 13 is removably secured, by means of the set screws (not shown), to a block 50 which corresponds to the tip 10 shown in FIG. 5.

The tip 10 shown in FIG. 1 can be practically formed from a plate blank, for example, by using a Numerical Control (NC) milling machine or NC grinder or profile copy machine tool, or the like.

The tip 10 shown in FIG. 1 has the end faces $A_1B_1C_1D_1$ and $A_2B_2C_2D_2$ which are both perpendicular to the axis $\overline{O_1O_2}$ of the cutter body 30.

Figure 9:
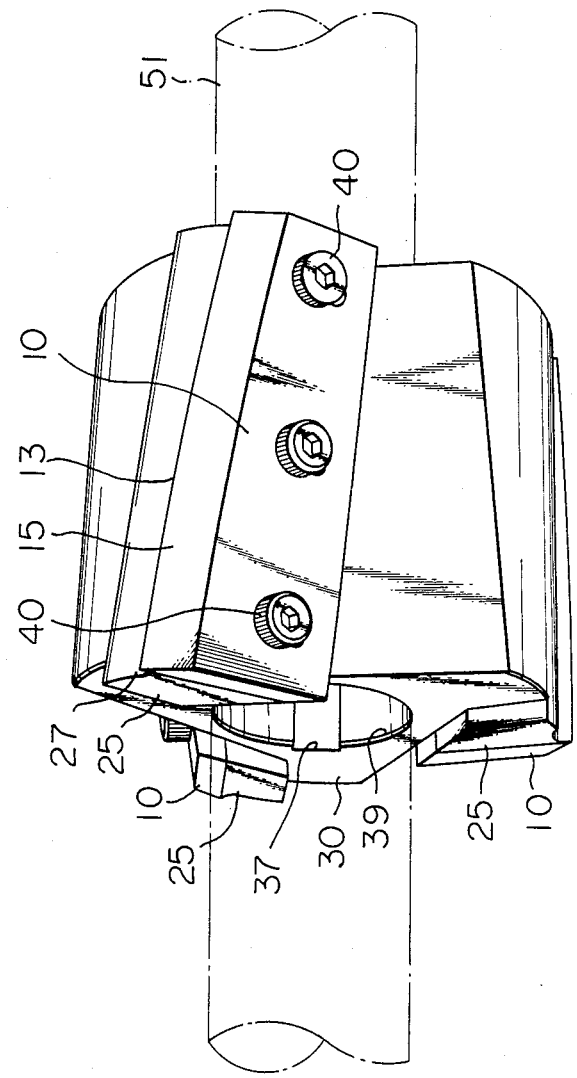
FIG. 9 is a perspective view of a cutter assembly having a cutter body with cutting edge tips.

In the illustrated embodiment in FIG. 9, three identical cutting edge tips 10 are attached to the cutter body 30 at an equiangular distance on the periphery of the body. However, only one or two tips 10 or more than three tips 10 can be provided on the cutter body 30. Furthermore, the tips 10 can be arranged at unequiangular distances on the cutter body 30, thereby contributing to the prevention of oscillation of or resonance of the tips 10.

The tips or swarfs of the workpiece to be cut by the cutter are received in the swarf-escaping grooves 27 and are then discharged therefrom by the revolution of the cutter about the center axis $\overline{O_1O_2}$.

The cutter body 30 has an axial hole 39 with a keyway 37. A rotatable drive shaft 51 (FIG. 9) is fitted in the axial hole 39 of the cutter body and is connected to the cutter body 30 by means of a key (not shown) arranged in the keyway 37 so that the cutter body 30 can revolve together with the rotatable drive shaft 51 about its center axis corresponding to the axis $\overline{O_1O_2}$ in FIG. 1.

Figure 10:
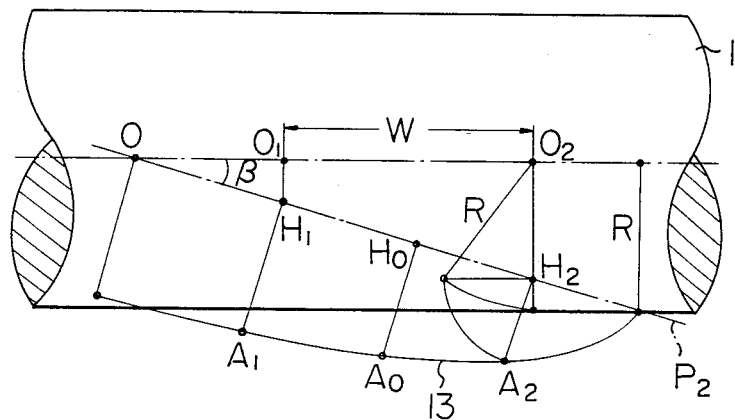
FIG. 10 is a schematic view of an elliptical profile of a cutting edge developed in a horizontal plane, according to the present invention.

As mentioned before, the profile of the cutting edge 13 is a part of an ellipse. In FIG. 10, an elliptical profile $A_1A_0A_2$ which is drawn by developing the rake surface 14 in a horizontal plane, that is, by turning the rake surface 14 down by 90°, is shown. The ellipse has a major axis radius equal to $R/\sin\beta$ and a minor axis radius equal to R, as can be seen from FIG. 10. The ellipse can be represented by the following equation in X-Y coordinate, as is well known.

$$\frac{X^2}{(R/\sin\beta)^2} + \frac{y^2}{R^2} = 1$$

From this equation, $$y = \sqrt{R^2 - X^2\sin^2\beta} \qquad (1)$$

When a height from a plane which includes the line $\overline{H_1H_2}$ and which is parallel to the clearance surface 15 is represented by $\bar{y}$ and when X is replaced by $\overline{X}$, then $\bar{y} = y \sin \gamma$ and the equation (1) is represented by the following equation (2) in the $\overline{X}$-$\overline{Y}$ coordinates;

$$\bar{y} = \sin\gamma \sqrt{R^2 - \overline{X}^2\sin^2\beta} \qquad (2)$$

That is, the generatrices of the clearance surface are represented by the equation (2).

When the surface 19 opposite to the rake surface 14 which is a plane is a plane parallel to the rake surface 14, a plurality of cutting edge tips 10 can be located on a work table of a surface grinding machine (not shown) and can be ground at one time, which results in the production of uniform cutting edge tips within a short period of time.

Figure 11:
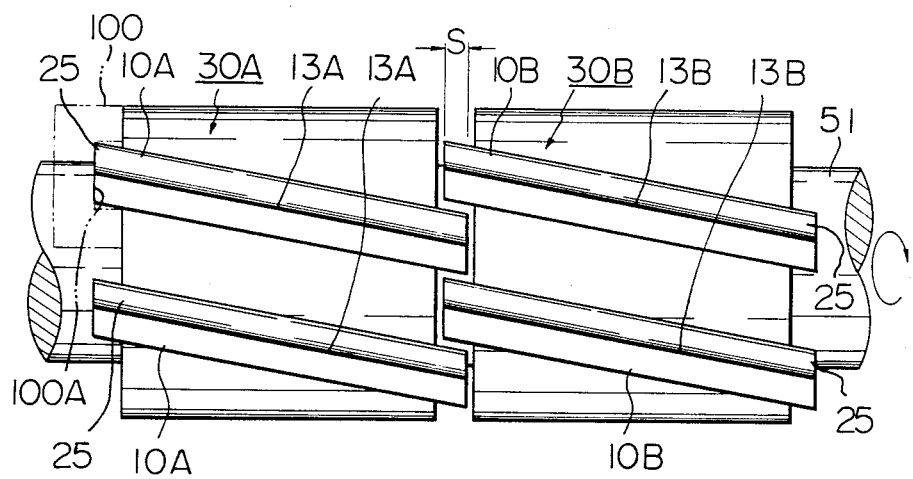
FIG. 11 is a plan view showing a tandem arrangement of cutter bodies on a drive shaft.

FIG. 11 shows a tandem arrangement of cutter bodies 30A and 30B on the common drive shaft 51. Preferably, the cutting edge tip 10 is longer in the axial direction of the cutter than the cutter body, as can be seen in FIG. 9, so that the opposed ends of the tip 10 in the direction of the length thereof project outward from the cutter body when the tip 10 is attached to the cutter body. When a plurality of cutter bodies 30A and 30B (although only two cutter bodies are arranged in tandem in FIG. 11, more than two cutter bodies can be arranged in the same fashion) are arranged in tandem on the drive shaft 51, the phases, i.e., the angular positions of the cutter bodies, differ from each other so that the tips and the cutting edges are located in alternative fashion, that is, the projecting ends of the tips 10A and the cutting edges 13A on the cutter body 30A are located between the projecting ends of the tips 10B and the cutting edges 13B on the adjacent cutter body 30B. Each cutter body in FIG. 11 has, for example, eight cutting edge tips on the periphery of the cutter body at an equiangular distance. In FIG. 11, only the profiles of the cutting edge tips and their cutting edges are schematically illustrated. As is apparent from FIG. 11, the cutting edges overlap in the range S when viewed in the direction of the rotational movement of the drive shaft 51. Due to the presence of the overlapping cutting edges, cutting can be continuously effected. That is, when a cutting point at which the cutting edge contacts the workpiece is shifted from the cutting edge 10A to the cutting edge 10B or from 10B to 10A, shifting can be smoothly and continuously effected because of the overlap of the cutting edges.

The tandem arrangement shown in FIG. 11 is available particularly for a workpiece having a large width. The number of cutter bodies in tandem on the drive shaft can be increased in accordance with a workpiece having a larger width.

As can be understood from the above discussion, according to the present invention, since the cutting point gradually shifts along the cutting edge when the cutter is rotated, just like a conventional helical cutting edge, cutting can be smoothly and continuously effected with respect to a cutting edge, with a decrease in noise.

Furthermore, according to the present invention, since the rake surface is not a curved one but a plane, it can be easily surface-ground to produce a new cutting edge after the original cutting edge has worn. After regrinding of the cutting edge, the cutting edge tips can be easily reattached to the cutter body at the original position merely by translating the tip in parallel motion on the supporting surface of the cutter body.

A workpiece is generally reciprocally moved in a horizontal plane parallel to the axis of the drive shaft of the cutter in directions normal to the axis of the drive shaft when the workpiece is machined by the cutter.

However, the cutter of the present invention can also be used for cutting a rotating workpiece, such as a cylinder or the like, in which the cutter and the workpiece rotate in opposite directions while being peripherally tangent to each other.

Figure 12:
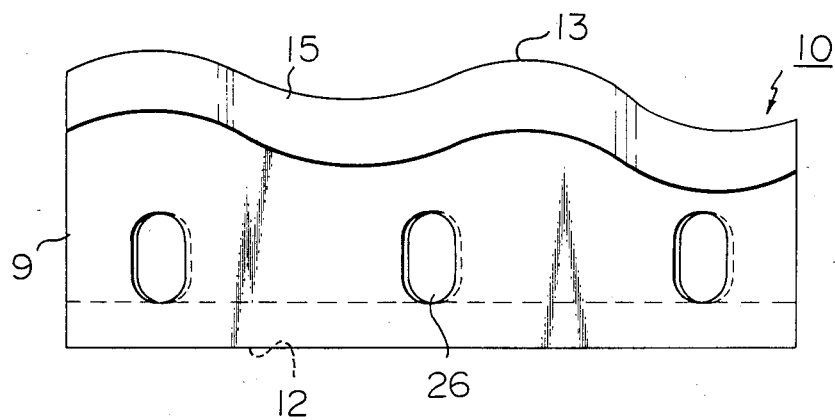
FIG. 12 is a front elevational view of another embodiment of a cutting tool edge tip.

Finally, it should be noted that the profile of the cutting edge of the cutting edge tip of the present invention is not limited to an elliptical one, as mentioned above, and can be any straight or curved line or combination thereof. FIG. 12 shows a modification of the cutting edge profile. Namely, the cutting edge profile corresponds to a surface profile of a workpiece to be ground. According to the cutting edge profile 13 shown in FIG. 12, a workpiece having a corresponding surface profile (not shown) can be cut or ground when the cutting edge and the workpiece rotate in opposite directions while being peripherally tangent to each other. A cutting edge tip having any profile line, for example, that shown in FIG. 12, can be obtained in the same way as explained hereinbefore.

I claim:

1. A rotary cutting tool comprising:
   an elongated cutter body having a center axis of rotation; at least one recess in said body forming an inclined plane with respect to said axis;
   at least one elongated cutting tip in said recess, said tip having a plate-like shape and a cutting edge profile which is defined by an intersection between a surface of revolution created by turning a contoured line segment about said center axis of said cutter body and said plane inclined with respect to said axis;
   a flat front rake surface of said tip in said plane and functioning as a regrindable surface for reproducing the edge profile of the tip when the edge is worn out;
   a top clearance surface of said tool being defined by a part of a cylindroid surface being generated by displacing each point in the cutting edge profile line in a fixed direction so as to make a predetermined constant tool angle with said rake surface;
   a lower end of said tip having a surface parallel to the clearance surface;
   said at least one recess for mounting said tip at the periphery of said cutter body including a front wall having means for fixing said tip thereto and a bottom wall, said front wall being inclined to said cutter body axis at the same angle as said rake plane of said tip and forming a corresponding plane surface for detachably connecting the rake surface plane thereto, said bottom wall being provided with a guiding surface having a parallel relationship to a directrix of said cylindroid surface to effectively cause an upwardly parallel displacement of the tip along the guiding surface toward the front wall as the lower end of said tip slides therealong, said cutting tip having means permitting said displacement whereby an original set condition of the cutting edge profile is constantly achievable.

2. A rotary cutting tool according to claim 1, characterized in that said surface of revolution is a circular cylindrical surface, the cutting edge profile line of said tip being defined as a part of an elliptical curve lying in one plane.

3. A rotary cutting tool according to claim 1, characterized in that the tip is secured to the front wall by interposing a swarf-treating block therebetween via fastening means.

4. A rotary cutting tool according to claim 2, characterized in that the tip is secured to the front wall by interposing a swarf-treating block therebetween via fastening means.

* * * * *